(12) United States Patent
Kuroda et al.

(10) Patent No.: US 6,611,902 B2
(45) Date of Patent: Aug. 26, 2003

(54) INFORMATION PROCESSOR AND INFORMATION PROCESSING METHOD

(75) Inventors: Toyoharu Kuroda, Osaka (JP); Kiyoshi Owada, Osaka (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 169 days.

(21) Appl. No.: 09/964,604

(22) Filed: Sep. 28, 2001

(65) Prior Publication Data
US 2002/0059504 A1 May 16, 2002

(30) Foreign Application Priority Data
Nov. 13, 2000 (JP) ........................................ 2000-345428

(51) Int. Cl.[7] .............................................. G06F 12/00
(52) U.S. Cl. ............................ 711/162; 711/161; 713/2; 717/168
(58) Field of Search ..................... 711/154, 161–162; 714/6; 707/202–204; 713/2; 717/168–178

(56) References Cited

U.S. PATENT DOCUMENTS

| 5,432,927 A | 7/1995 | Grote et al. ................... 713/2 |
| 5,860,122 A * | 1/1999 | Owada et al. ............... 711/162 |
| 6,070,012 A | 5/2000 | Eitner et al. ................. 717/168 |
| 6,209,127 B1 | 3/2001 | Mori et al. .................... 717/11 |

FOREIGN PATENT DOCUMENTS

| JP | 5-81141 | 4/1993 |
| JP | 7-200415 | 8/1995 |
| JP | 8-195952 | 7/1996 |
| WO | 98/34169 | 8/1998 |

* cited by examiner

Primary Examiner—Donald Sparks
Assistant Examiner—Nasser Moazzami
(74) Attorney, Agent, or Firm—Wenderoth, Lind & Ponack, L.L.P.

(57) ABSTRACT

The present invention provides an information processor and an information processing method, which reduces the memory capacity and utilizes a free space in a memory area as a cache area for EPG. This information processor includes a program obtaining means 5, a program storage means 2 which has plural storage areas, a program execution means 13, a selection information updating means 11 that stores execution memory information indicating a storage area which contains a program to be executed by the program execution means 13, compression information which indicates compression states of programs stored in the storage areas, and memory relation information which indicates the relation of the plural storage areas, a program execution area switching means 4 for selecting one of the storage areas on the basis of the execution memory information, a storage area switching means 3 for selecting one of the storage areas on the basis of the information in the selection information updating means 11, a program writing means 6, a program compression means 7, a program restoration means 12 for restoring a program which has been compressed by the program compression means 7, and a memory information updating means 8 for updating information stored in the selection information updating means 11.

13 Claims, 8 Drawing Sheets

INFORMATION PROCESSOR AND INFORMATION PROCESSING METHOD

FIELD OF THE INVENTION

The present invention relates to an information processor and an information processing method and, more particularly, to an improved information processor and information processing method for downloading a program via digital broadcasting.

BACKGROUND OF THE INVENTION

In recent years, with the diversification of broadcasting systems, an apparatus that is connected to a television receiver and provides various functions, i.e., an STB has come along for receiving a new broadcasting method. Especially, with the start of the digital broadcasting, an apparatus which receives Electronic Program Guide (hereinafter, referred to as EPG) information that is text data, hyper text data or the like for guiding programs and is transmitted together with a digital broadcast signal, by using the STB, and displays the EPG information on a screen has been known.

This type of information processor obtains digital information such as EPG from a broadcast signal, while there are some processors that receive a new program which is superimposed on the broadcast signal and transmitted and update an old program, thereby updating the functions so as to correspond to newly coming broadcast services or the like.

In these information processors, data or a program that is received by the STB is stored in a memory. However, when abnormal conditions such as a power failure and a bug in a program occur during the download, memory contents may be destroyed and thus the system may not operate normally.

Accordingly, a backup of the program is retained in a nonvolatile memory such as an electrically erasable and programmable ROM (hereinafter, referred to as EEPROM), and when the program is resumed the backed-up program is taken out from the EEPROM to set the memory contents again.

This kind of information processor includes two nonvolatile memories to store a pre-update program in one memory as a backup and store an update-version program that is being downloaded in the other memory. To be more specific, when two memories are included, the program is stored alternately in the two memories every time the program is updated. When the information processor includes two nonvolatile memories as described above, even when an error or power failure occurs during writing of a program, the program can be restarted because the backup program is stored.

In this conventional information processor, when the new program is successfully downloaded, the old program is left as the backup program for the time being, but there is a high possibility that the old program is not used thereafter. As cases where the old program is used, a case where some fault occurs in the new program during activation of the program and then the old program is read out and used, and the like are conceivable. However, when the new program operates satisfactorily, the old program is never used.

As described above, in the conventional information processor, it is required that a nonvolatile memory having a capacity twice as much as a program should be used as countermeasures against abnormal conditions during writing of the program which rarely occur, such as the occurrence of an error and power failure, whereby the system has quite a low memory efficiency.

SUMMARY OF THE INVENTION

It is an object of the present invention to provide an information processor and an information processing method, which can reduce a memory capacity required for backup of a program and utilize a free space in the memory as a cache area of EPG.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an information processor comprising: a program obtaining means for obtaining a program; a program storage means having plural storage areas and storing the program obtained by the program obtaining means in any of the plural storage areas; a program execution means for executing the program; a selection information updating means for storing execution memory information indicating a storage area which contains a program to be executed by the program execution means, compression information indicating compression states of programs stored in the storage areas, and memory relation information indicating a relation of the plural storage areas; a program execution area switching means for selecting one of the storage areas on the basis of the execution memory information; a storage area switching means for selecting one of the storage areas on the basis of the information in the memory information storage area; a program writing means for writing the program; a program compression means for compressing the program; a program restoration means for restoring the program compressed by the program compression means; and a memory information updating means for updating information stored in the selection information updating means. Therefore, a free space in a memory can be allocated to input of other data, whereby it can be utilized efficiently.

According to a 2nd aspect of the present invention, in the information processor of the 1st aspect, the program execution means executes a program stored in the storage area which is selected by the program execution area switching means on the basis of the execution memory information. Therefore, the program execution means can always select a storage area in which a program of the latest version is stored, and execute the latest version program.

According to a 3rd aspect of the present invention, in the information processor of the 1st or 2nd aspect, the program writing means writes the program obtained by the program obtaining means in the storage area which is selected by the storage area switching means on the basis of the execution memory information and the memory relation information. Therefore, a newly obtained program can be written in a memory that is not being used at present.

According to a 4th aspect of the present invention, in the information processor of any of the 1st to 3rd aspects, the program compression means compresses a program stored in the storage area which is selected by the storage area switching means on the basis of the execution memory information, the compression information and the memory relation information, and the program writing means writes the compressed program in the same storage area as said storage area. Therefore, a program stored in a memory that is not being used at present can be compressed, and a generated free space can be allocated to input of other data, whereby the memory can be utilized effectively.

According to a 5th aspect of the present invention, in the information processor of the 4th aspect, the program restoration means restores the compressed program stored in the storage area which is selected by the storage area switching means on the basis of the execution memory information, the compression information and the memory relation information, and the program writing means writes the restored program in the same storage area as said storage area. Therefore, when an error occurs while an activated program is being executed or when an error occurs while a program is being updated, a compressed program can be restored and executed.

According to a 6th aspect of the present invention, in the information processor of any of the 1st to 5th aspects, the program storage means is a nonvolatile memory. Therefore, when other information is written to effectively use a free space in a memory, that information can be stored without power consumption.

According to a 7th aspect of the present invention, in the information processor of any of the 1st to 4th aspects, a free space in the storage area, which is obtained by compressing the program by the program compression means, is used as a cache area for an electronic program guide. Therefore, the EPG or data broadcast can be utilized immediately after the power is turned on without a latency time.

According to an 8th aspect of the present invention, there is provided an information processing method comprising: a program obtaining step of obtaining a program; a program storage step of storing the program obtained in the program obtaining step in any of plural storage areas; a program execution step of executing the program; a memory information storage step of storing execution memory information indicating a storage area which contains a program to be executed in the program execution step, compression information indicating compression states of programs stored in the storage areas, and memory relationship information indicating a relation of the plural storage areas; a program execution area switching step of selecting one of the storage areas on the basis of the execution memory information; a program storage area switching step of selecting one of the storage areas on the basis of the information stored in the memory information storage step; a program writing step of writing the program; a program compression step of compressing the program; a program restoration step of restoring the program compressed in the program compression step; and a memory information updating step of updating the information stored in the memory information storage step. Therefore, a free space in a memory can be allocated to input of other data, whereby it can be utilized effectively.

According to a 9th aspect of the present invention, in the information processing method of the 8th aspect, in the program execution step, a program stored in the storage area which is selected in the program execution area switching step on the basis of the execution memory information is executed. Therefore, in the program execution step, a storage area in which a program of the latest version is stored can be always selected and the latest version program can be executed.

According to a 10th aspect of the present invention, in the information processing method of the 8th or 9th aspect, in the program writing step, the program obtained in the program obtaining step is written in the storage area which is selected in the storage area switching step on the basis of the execution memory information and the memory relation information. Therefore, a newly obtained program can be written in a memory that is not being used at present.

According to an 11th aspect of the present invention, in the information processing method of any of the 8th to 10th aspects, in the program compression step, a program stored in the storage area which is selected on the basis of the execution memory information, the compression information and the memory relation information in the storage area switching step of selecting one of the storage areas is compressed, and in the program writing step, the compressed program is written in the same storage area as said storage area. Therefore, a free space in a memory can be allocated to input of other data, whereby the memory can be utilized effectively.

According to a 12th aspect of the present invention, in the information processing method of the 11th aspect, in the program restoration step, the program compressed in the storage area which is selected in the storage area switching step on the basis of the execution memory information, the compression information and the memory relation information is restored, and in the program writing step, the restored program is written in the same storage area as said storage area. Therefore, when an error occurs while an activated program is being executed or when an error occurs while a program is being updated, a compressed program can be restored and executed.

According to a 13th aspect of the present invention, there is provided a computer-readable storage medium which contains a program for making a computer implement: a program obtaining process for obtaining a program; a program storage process for storing the program obtained in the program obtaining process in any of plural storage areas; a program execution process for executing the program; a memory information storage process for storing execution memory information indicating a storage area which contains a program to be executed in the program execution process, compression information indicating compression states of programs stored in the storage areas, and memory relation information indicating a relation of the plural storage areas; a program execution area switching process for selecting one of the storage areas on the basis of the execution memory information; a storage area switching process for selecting one of the storage areas on the basis of the information stored in the memory information storage process; a program writing process for writing the program; a program compression process for compressing the program; a program restoration process for restoring the program compressed in the program compression process; and a memory information updating process for updating the information stored in the memory information storage process. Therefore, respective processes of the present invention can be easily implemented in other information processor that includes plural storage areas, by transporting this storage medium.

DETAILED DESCRIPTION OF THE PREFERRED EMBODIMENTS

Hereinafter, an embodiment of the present invention will be described.

Embodiment 1

According to an information processor and an information processing method of the first embodiment, two memories are included, and a free memory space which is created by compressing a program that is not being executed at present among programs which are stored in the respective memories is used as a cache area for EPG.

Figure 1:
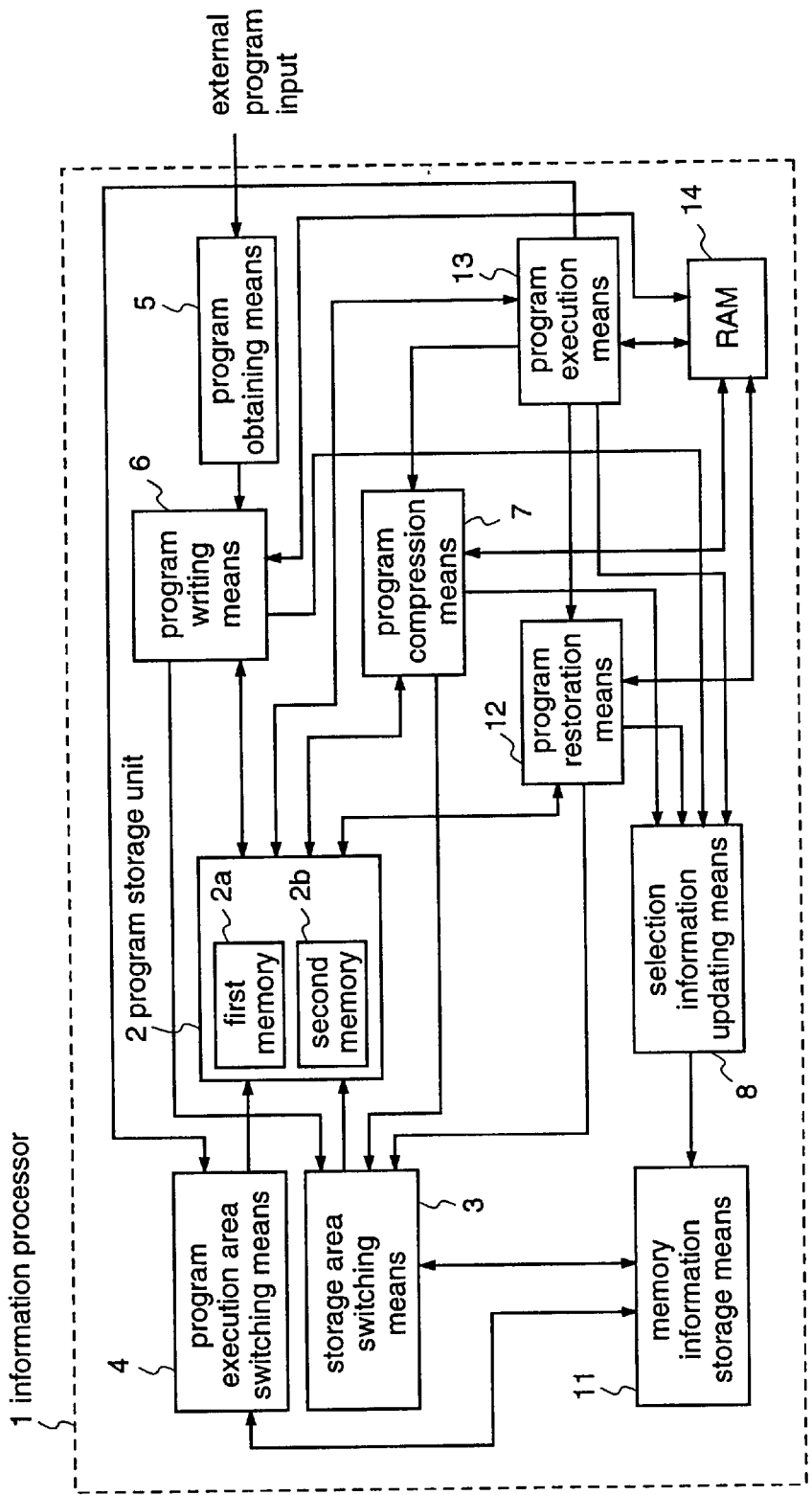
FIG. 1 is a block diagram illustrating a structure of an information processor according to a first embodiment of the present invention.

FIG. 1 is a block diagram for explaining a structure of the information processor 1 according to the first embodiment.

In FIG. 1, the information processor 1 is constituted by a program storage unit 2, a storage area switching means 3, a program execution area switching means 4, a selection information updating means 11, a program obtaining means 5, a program writing means 6, a program compression means 7, a memory information updating means 8, a program restoration means 12, a program execution means 13, and a RAM 14.

Hereinafter, the respective components will be described.

The program storage unit 2 stores programs and comprises erasable and programmable nonvolatile memories. In this first embodiment, the program storage unit 2 has two memories, i.e., a first memory 2a and a second memory 2b, and each memory corresponds to one storage area. Here, these two memories 2a and 2b can be also implemented by dividing one memory into two storage areas.

The selection information updating means 11 is implemented by an erasable and programmable nonvolatile memory. The selection information updating means 11 contains "execution memory information" concerning a memory which contains a program to be executed by the program execution means 13, "compression information" as to whether a program stored in a memory is compressed or not, and "memory relation information" which indicates information of the correlation between plural memories included in the program storage unit 2. FIGS. 2(a) and 2(b) are diagrams for explaining examples of the respective information that is stored in the selection information updating means 11.

Figure 2:
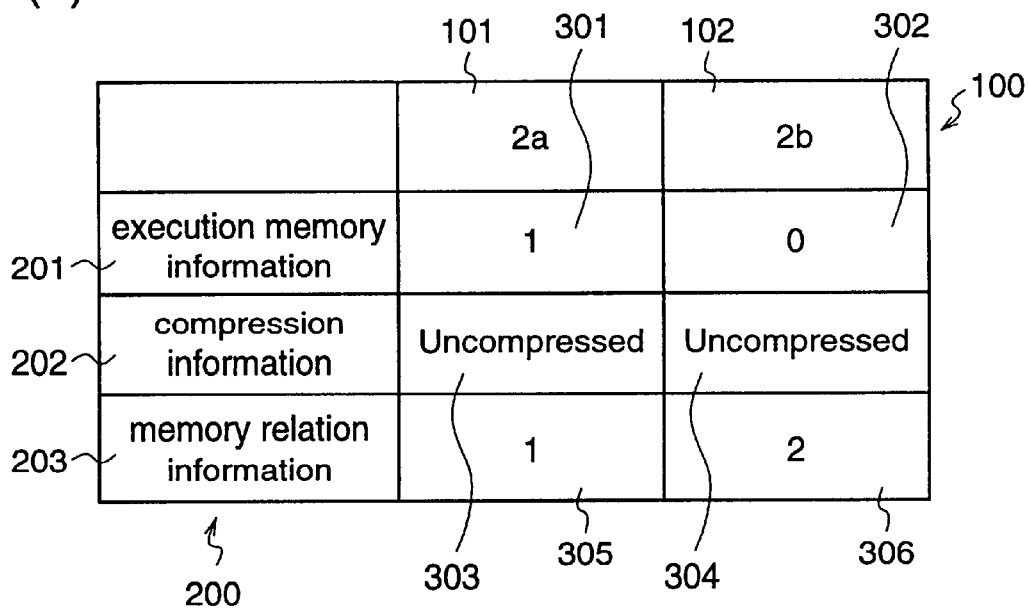
FIGS. 2(a) and 2(b) are diagrams for explaining examples of each information that is stored in a selection information updating means according to the first embodiment.
Figure 2:
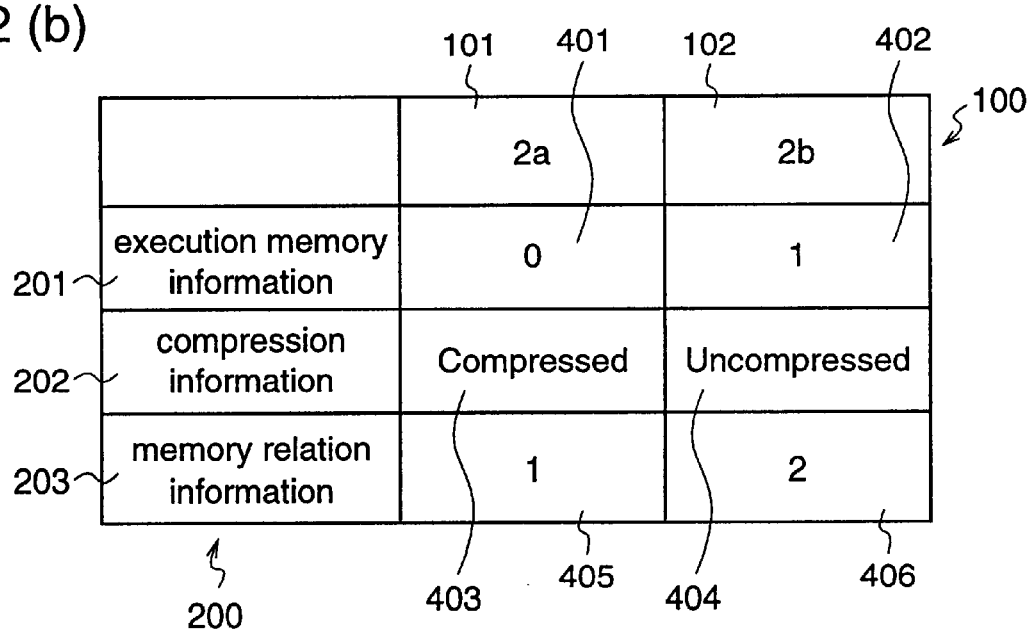

Numeral 100 in FIG. 2 denotes information of respective memories included in the program storage unit 2, which shows examples of "execution memory information", "compression information" and "memory relation information" in a case where the program storage unit 2 is constituted by two memories, i.e., the memories 2a and 2b. Numeral 200 denotes respective information stored in the selection information updating means 11, which comprises "execution memory information" 201, "compression information" 202, and "memory relation information" 203. Numerals 301 and 302 denote respective "execution memory information" of the memories 2a and 2b, and information "1" is written when a program which is to be executed by the program execution means 13 is stored, and information "0" is written when a program to be executed is not stored. Numerals 303 and 304 denote respective "compression information" of the memories 2a and 2b, and either information which indicates that the programs stored in the memories 2a and 2b are "Compressed" or "Uncompressed" is stored, respectively. Numerals 305 and 306 denote respective "memory relation information" which is written in the memories 2a and 2b, and it indicates the order in which programs are stored in the memories 2a and 2b. In this case, assume that the memories 2a and 2b which are included in the program storage unit 2 are selected and switched in the following order: first memory 2a second memory 2b first memory 2a. To be more specific, respective numbers "1" and "2" of the information 305 and 306 indicate the order of the programs to be selected. When a program that is being executed is stored in the first memory 2a, a newly updated program is stored in the second memory 2b.

The storage area switching means 3 selects one target memory from the plural memories included in the program storage unit 2 on the basis of the "execution memory information", the "compression information" and the "memory relation information" stored in the selection information updating means 11, and switches over to the selected memory.

The program execution area switching means 4 reads the "execution memory information" stored in the selection information updating means 11, selects one target memory from the plural memories, and switches over to the selected memory.

The program obtaining means 5 obtains a program from the outside, i.e., a broadcast receiving unit (not shown) of an STB which contains the information processor 1.

The program writing means 6 writes the program which is obtained by the program obtaining means 5 in the memory 2a or 2b which has been selected by the storage area switching means 3.

The program compression means 7 compresses a program stored in the memory 2a or 2b which has been selected by the storage area switching means 3 as a compression target.

The program restoration means 12 restores a program stored in the memory 2a or 2b which has been selected by the storage area switching means 3 as a restoration target.

The memory information updating means 8 updates the respective information ("execution memory information", "compression information" and "memory relation information") that is stored in the selection information updating means 11 when the program writing process in the program writing means 6, the program compression process in the program compression means 7, and the program restoration process in the program restoration means 12 are normally carried out, respectively, so that the information about the memory in which the respective processes have been carried out is updated.

The program execution means 13 executes a program stored in the memory 2a or 2b which has been selected by the program execution area switching means 4.

The RAM 14 is used as a work area when a program is executed by the program execution means 13.

A description will be given of the operation of the information processor 1 which is constructed as described above.

Figure 3:
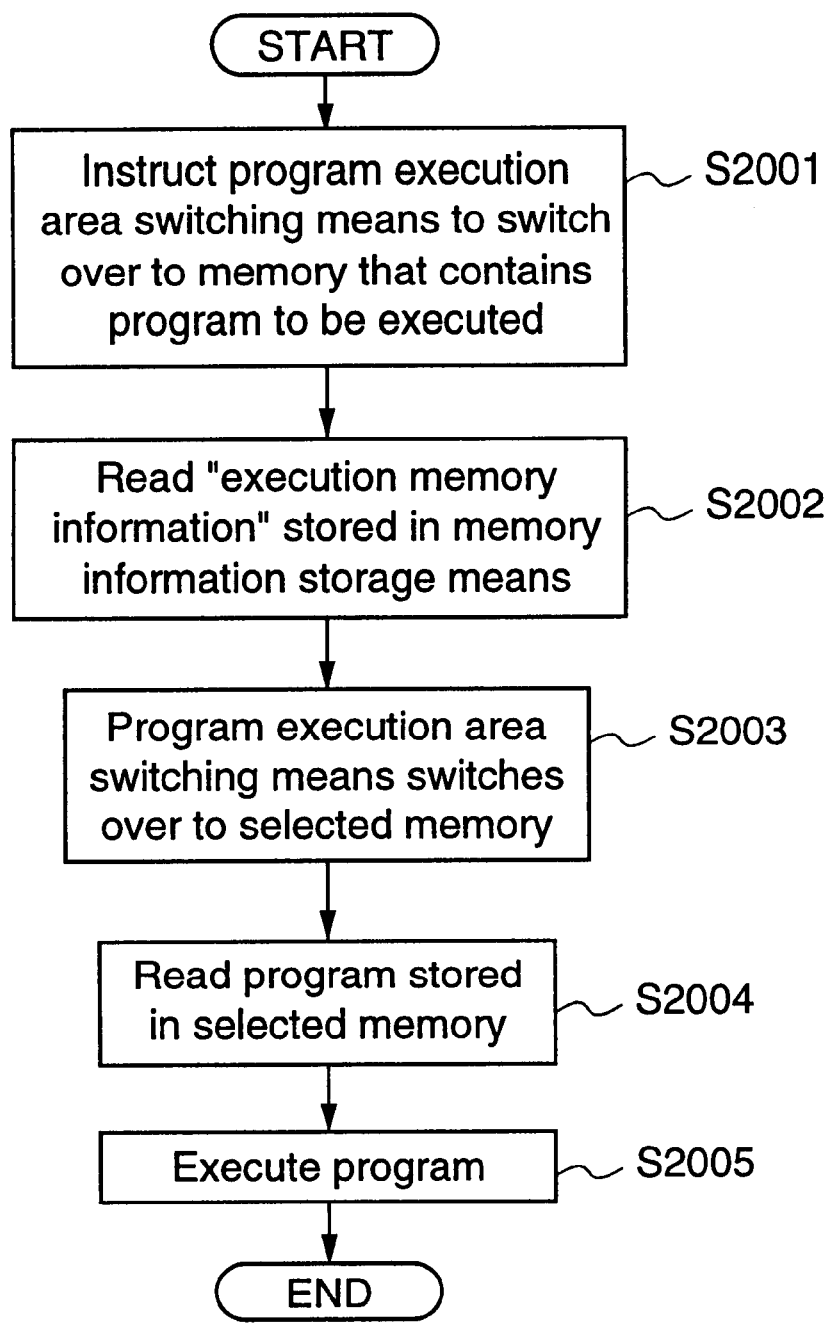
FIG. 3 is a flowchart for explaining processes when a program is executed according to the first embodiment.

FIG. 3 is a flowchart for explaining processes when a program is executed according to the first embodiment.

Initially, in order to perform switching to the memory 2a or 2b that contains a program to be executed, the program execution means 13 gives an instruction to the program execution area switching means 4 for switching the program storage unit 2 (step S2001). The program execution area switching means 4 reads the "execution memory information" stored in the selection information updating means 11 (step S2002), selects one of the memories included in the program storage unit 2 on the basis of the information, and switches over to the selected memory (step S2003). The program execution means 13 reads a program stored in the memory which has been selected by the program execution area switching means 4 (step S2004), and executes the readout program (step S2005).

In the example of FIG. 2(a), the memory is switched over to the memory 2a in which the "execution memory information" is "1" and a program stored in the memory 2a is executed.

Figure 4:
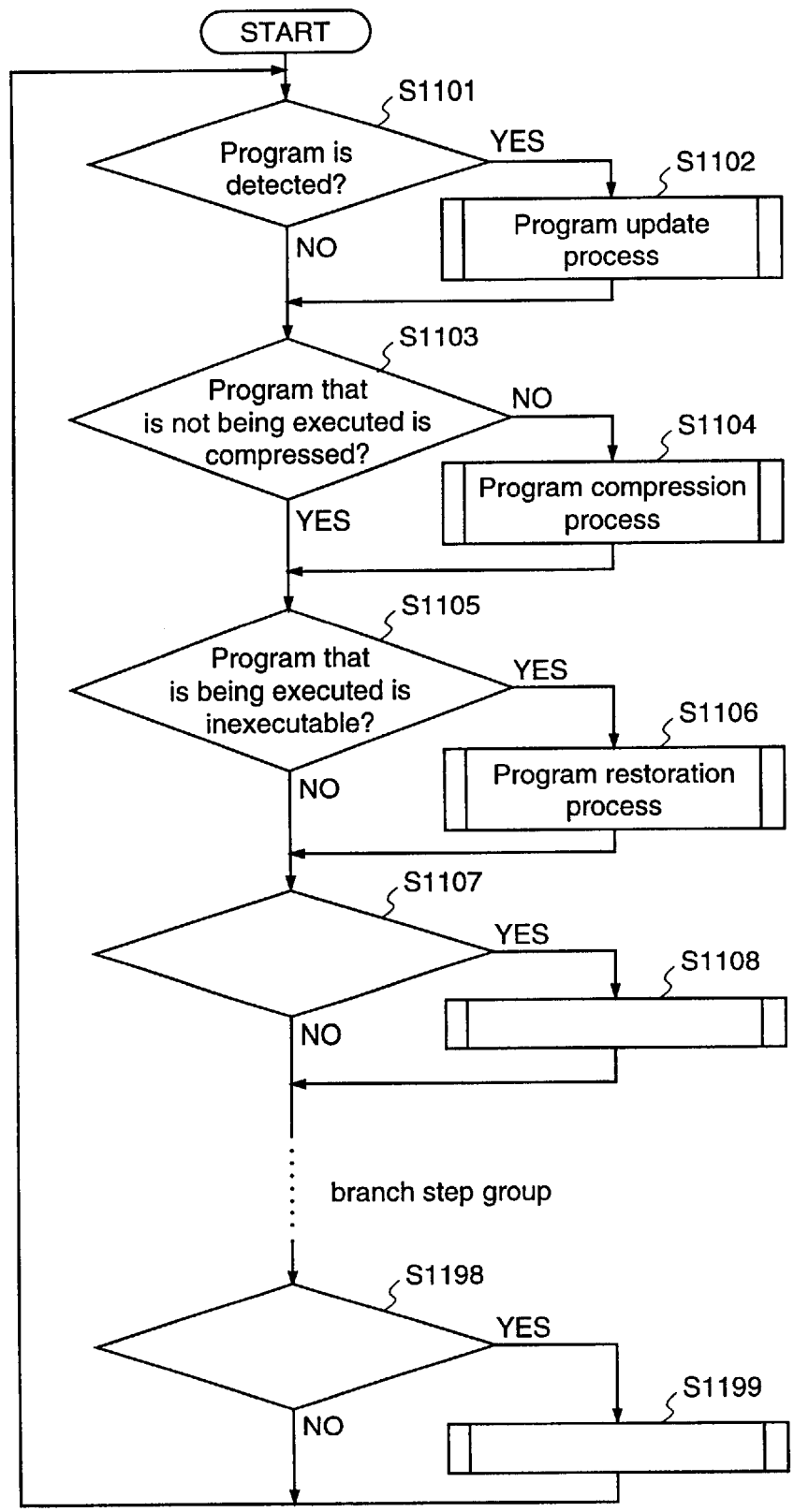
FIG. 4 is a flowchart for schematically explaining an operation of the whole processing according to the first embodiment.

FIG. 4 is a flowchart for schematically explaining an operation of the whole processing according to the first embodiment.

Initially, the information processor 1 decides whether a program is detected in multiplexed data of a digital broadcast that is obtained by the program obtaining means 5 (step S1101). When it is decided in step S1101 that a program is detected, the operation proceeds to step S1002, and then the information processor 1 executes a "program update process" for writing the program (update program) which is obtained by the program obtaining means 5 into a memory in the program storage unit 2, which has been selected by the storage area switching means 3.

On the other hand, when it is decided in step S1101 that the program is not detected or when the operation of the "program update process" (step S1102) has been completed, the program compression means 7 reads the "execution memory information", the "compression information" and the "memory relation information" stored in the selection information updating means 11, to decide whether a program stored in the memory 2a or 2b is compressed or not (step S1103). This decision is made for a memory other than a memory which contains the program that is being executed.

When it is decided as a result of the decision in step S1103 that the program is not compressed, the operation proceeds to step S1104 and then the program compression means 7 executes a "program compression process". On the other hand, when it is decided in step S1103 that the compression of the program is completed or when the operation of the "program compression process" (step S1104) has been completed, the program execution means 13 decides whether the program that is being executed is inexecutable or not (step S1105). The decision as to whether the program that is being executed is inexecutable or not can be made by checking whether the program has been restarted, for example, due to occurrence of a watch dog reset which performs resetting when runaway of a program is detected.

When it is decided as a result of the decision in step S1105 that the program that is being executed is inexecutable, the operation proceeds to step S1106 and then the program restoration means 12 executes a "program restoration process". On the other hand, when it is decided in step S1105 that the program that is being executed operates normally or when the operation of the "program restoration process" (step S1106) has been completed, the operation proceeds to step S1107 and following steps.

Steps S1107 to S1199 are branch step groups, in which the information processor 1 activates other control steps due to external factors, including for example initiation of a service program of the STB. Here, no description will be given of these branch step groups because they are not the main purposes of the present invention. After steps S1198 and S1199 are finished, the operation returns to step S1101 again, and then it is decided whether a program is detected or not.

Hereinafter, each process in the overview of the whole processing as shown in FIG. 4 will be described.

Figure 5:
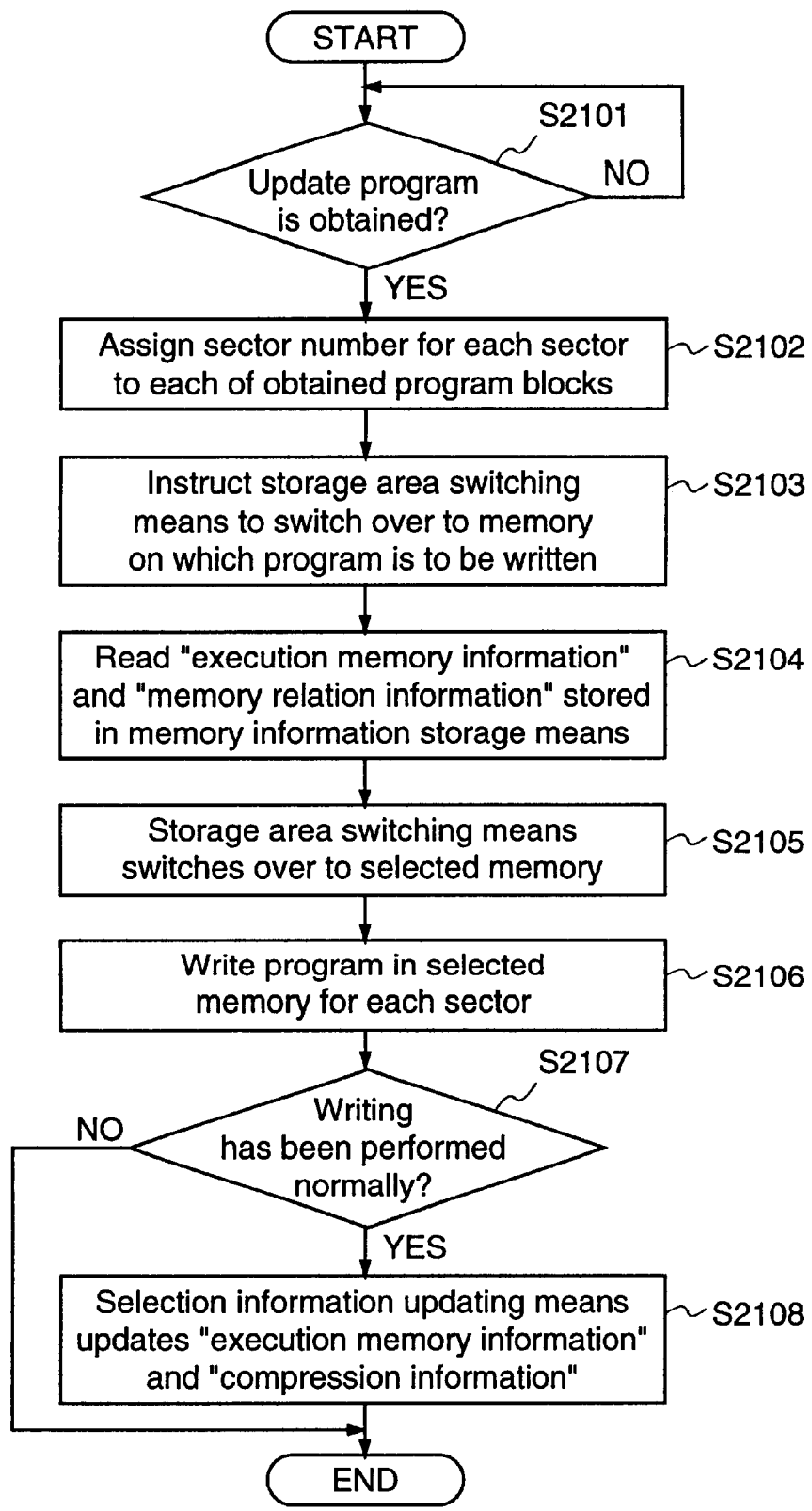
FIG. 5 is a flowchart for explaining an operation for executing a program update process according to the first embodiment.

FIG. 5 is a flowchart for explaining the operation for executing the program update process according to the first embodiment.

Initially, when it is decided in step S1101 in FIG. 4 that the information processor 1 has obtained a program by the program obtaining means 5, the program obtaining means 5 decides whether or not the obtained program is the same as the one stored in the program storage unit 2 or an upper-version program (step S2101 in FIG. 5). This decision is made for example by detecting version information included in the program. When the program obtaining means 5 decides in step S2101 that the same or upper-version program has been obtained, the operation proceeds to step S2102. Here, the program obtained by the program obtaining means 5 is divided into program blocks and then broadcast. Address spaces in the respective memories included in the program storage unit 2 are divided into plural sectors, and the program can be written in sector units. With respect to the program that is obtained by the program obtaining means 5, the sector number is assigned to each program block for each sector (step S2102).

When the program obtaining means 5 obtains a program, in order to switch over to a memory on which the program is to be written, the program writing means 6 gives an instruction to the storage area switching means 3 for switching the program storage unit 2 (step S2103). The storage area switching means 3 reads the "execution memory information" and the "memory relation information" stored in the selection information updating means 11 (step S2104), selects a memory included in the program storage unit 2 on the basis of the information, and switches over to the selected memory (step S2105). To be more specific, the storage area switching means 3 reads information of a memory that contains a program to be executed from the "execution memory information", detects information related to a memory in which the obtained program is to be downloaded from the "memory relation information", and switches over to the selected memory.

The program writing means 6 writes the program in the sectors of the memory selected by the storage area switching means 3, for each sector, which sectors have the same sector numbers as the numbers of the program blocks, respectively (step S2106). Then, it is decides whether the writing has been performed normally or not (step S2107), and when the program has been written normally, the program writing means 6 gives an instruction to the memory information updating means 8 to update the "execution memory information" and the "compression information" stored in the selection information updating means 11 (step S2108). For example, when a program that is being executed is stored in the first memory 2a, the memory information updating means 8 updates the memory information shown in FIG. 2(a), i.e., updates the information 301 stored in the selection information updating means 11 into "0", the information 302 into "1" by writing the obtained program in the second memory 2b, and the information 304 into "Uncompressed", respectively.

On the other hand, when the writing has not been performed normally in step S2107, the program writing means 6 does not update the information stored in the selection information updating means 11 and then the operation is finished.

Figure 6:
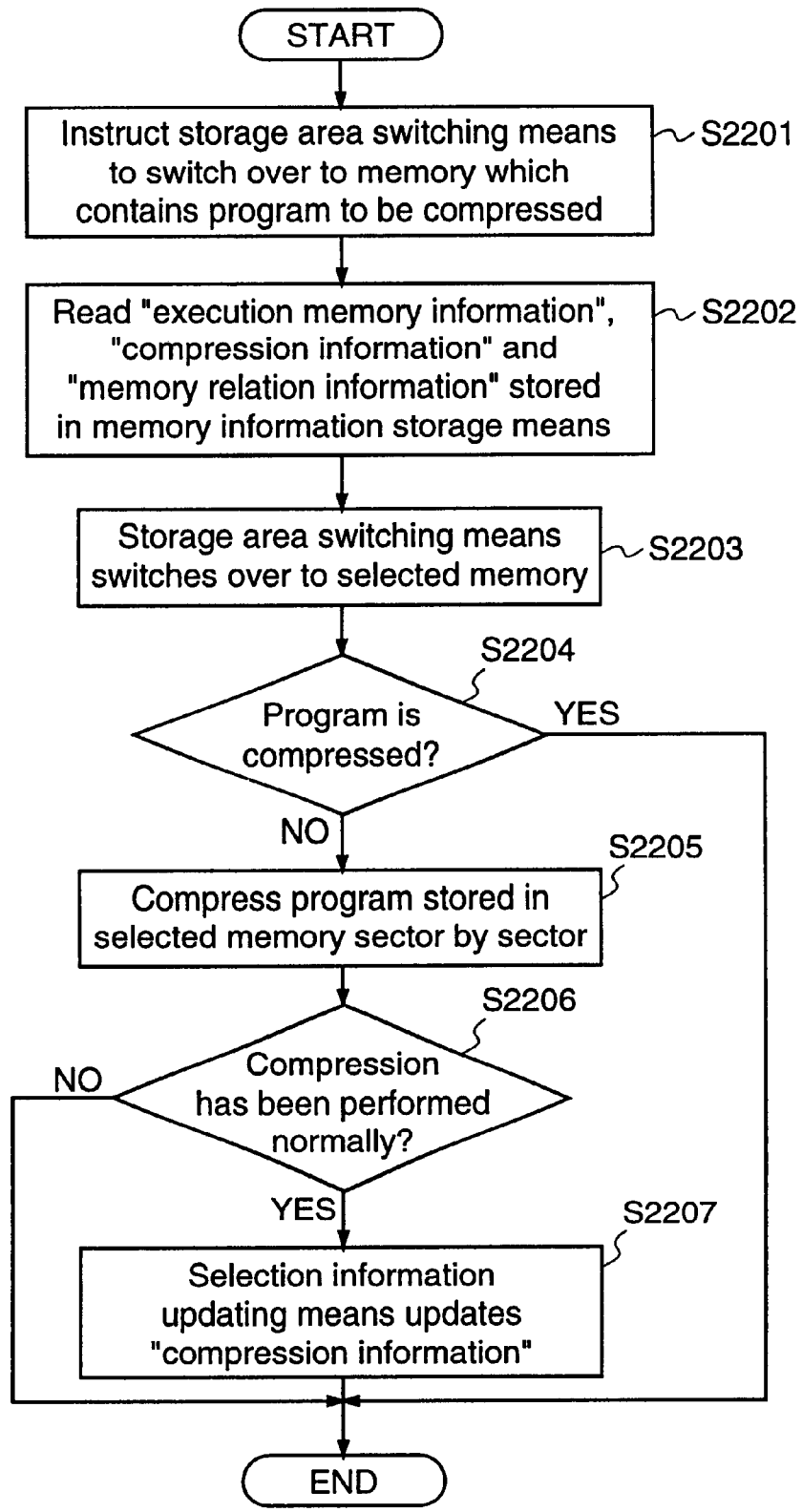
FIG. 6 is a flowchart for explaining an operation for executing a program compression process according to the first embodiment.

FIG. 6 is a flowchart for explaining the operation for executing the program compression process according to the first embodiment.

Initially, when it is decided in step S1103 in FIG. 4 that a program that is not being executed (program stored in a memory whose "execution memory information" is "0") is not compressed, the operation proceeds to step S2201 in FIG. 6. In order to switch over to a memory that contains a program to be compressed, the program compression means 7 gives an instruction to the storage area switching means 3 for switching the program storage unit 2 (step S2201). The storage area switching means 3 reads the "execution memory information", the "compression information", and the "memory relation information" stored in the selection information updating means 11 (step S2202), selects a memory included in the program storage unit 2 on the basis of the information, and switches over to the selected memory (step S2203). To be more specific, the storage area switching means 3 reads information of a memory other than a memory that contains a program to be executed from the "execution memory information", detects information of a memory in which a program was stored immediately before from the "memory relation information" out of the memory information, and switches over to the selected memory.

The program compression means 7 decides whether a program stored in the memory that has been selected by the storage area switching means 3 is compressed or not (step S2204), and when the program is not compressed, the program compression means 7 compresses the stored program, sector by sector (step S2205). Then, the program compression means 7 decides whether the compression has been performed normally up to the last sector (step S2206), and when the compression of the program has been performed normally, the program compression means 7 gives an instruction to the memory information updating means 8 to update the "compression information" stored in the selection information updating means 11 (step S2207). To be more specific, when the first memory 2a contains a program to be compressed, the memory information updating means 8 updates the information 403 stored in the selection information updating means 11 to be "Compressed", as shown in FIG. 2(b).

When the compression has not been performed normally by the program compression means 7 in step S2206, the operation is finished.

Figure 7:
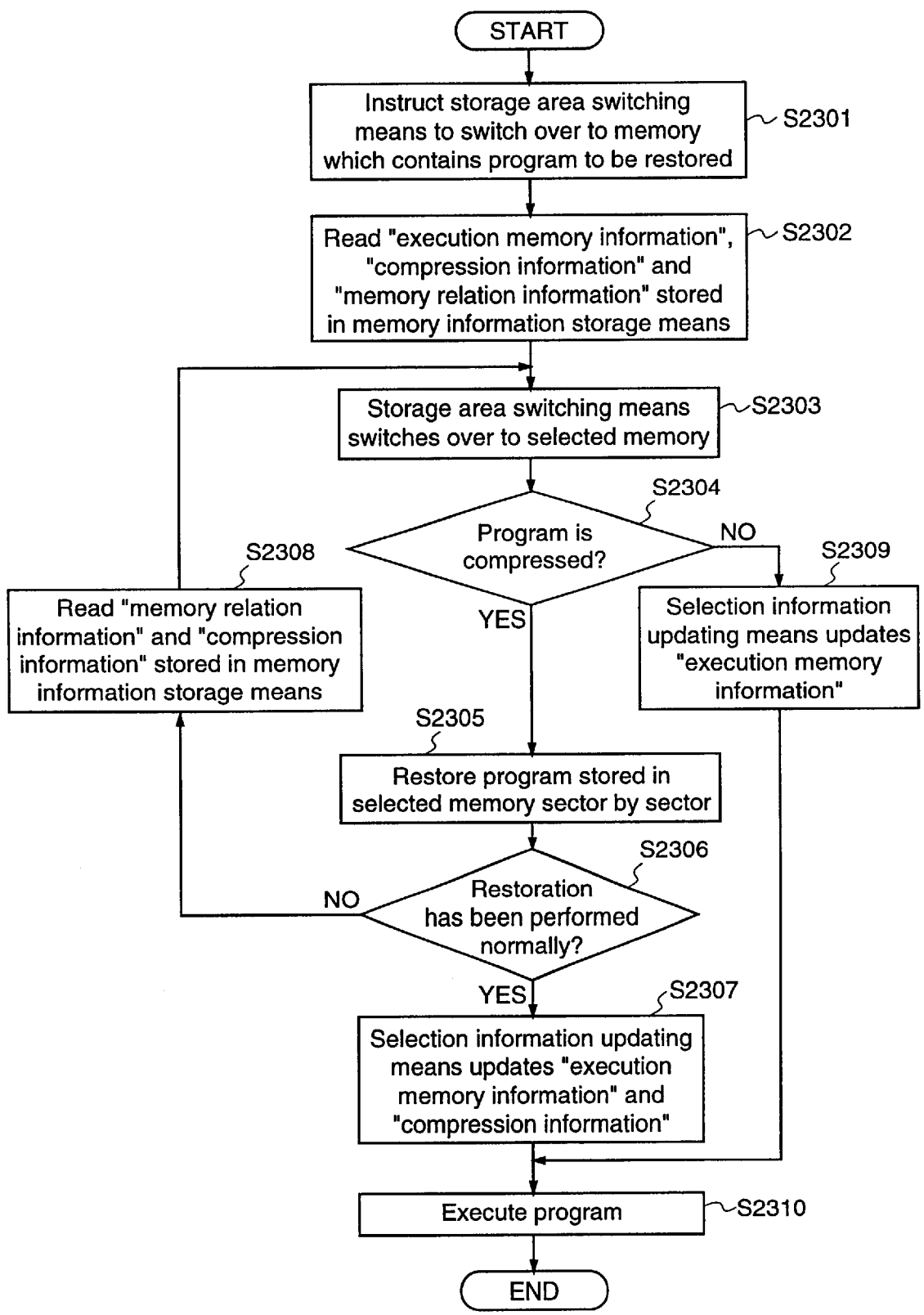
FIG. 7 is a flowchart for explaining an operation for executing a program restoration process according to the first embodiment.

FIG. 7 is a flowchart showing the operation for executing the program restoration process according to the first embodiment.

Initially, when the program execution means 13 decides in step S1105 in FIG. 4 that the program which is being executed is inexecutable, the operation proceeds to step S2301 in FIG. 7. In order to switch over to a memory that contains a program to be restored, the program restoration means 12 gives an instruction to the storage area switching means 3 for switching the program storage unit 2 (step S2301). The storage area switching means 3 reads the "execution memory information", the "compression information" and the "memory relation information" stored in the selection information updating means 11 (step S2302), selects the memory 2a or 2b included in the program storage unit 2 on the basis of the information, and switched over to the selected memory (step S2303). To be more specific, the storage area switching means 3 reads information of a memory other than a memory that contains a program to be executed from the "execution memory information", detects information of a memory in which a program was stored immediately before from the "memory relation information" out of the memory information, and switches over to the selected memory.

The program restoration means 12 decides whether a program stored in the memory that has been selected by the storage area switching means 3 is compressed or not (step S2304), and when it is compressed, the program restoration means 12 restores the stored program, sector by sector (step S2305). Then, the program restoration means 12 decides whether the restoration has been performed normally up to the last sector (step S2306), and when the restoration of the program has been performed normally, the program restoration means 12 gives an instruction to the memory information updating means 8 to update the "execution memory information" and the "compression information" stored in the selection information updating means 11 (step S2307). To be more specific, when the second memory 2b contains a program which has been decided to be inexecutable, the memory information updating means 8 updates the memory information as shown in FIG. 2(a), i.e., updates the information 302 stored in the selection information updating means 11 into "0", and updates the information 301 into "1" and the information 303 into "Uncompressed", respectively, by restoring a program in the first memory 2a, which was stored immediately before. Then, the program execution means 13 reads the program restored by the program restoration means 12 from the program storage unit 2, and executes the readout program (step S2310).

On the other hand, when it is decided in step S2306 that the restoration has not been performed normally up to the last sector, the storage area switching means 3 reads the "compression information" and the "memory relation information" stored in the selection information updating means 11 (step S2308). To be more specific, when information of a memory which contains a program immediately preceding the program in the target memory in step S2302 is obtained from the "memory relation information", the operation returns to step S2303.

Here, when the restoration has not been performed normally because of the powering off during the restoration, the memory is restored again. In this case, the program restoration means 12 executes the processes again from step S2301. Further, a flag indicating a memory that was being restored can be set.

When it is decided in step S2304 that the program stored in the restoration target memory is not compressed, the program restoration means 12 does not carry out the restoration process and gives an instruction to the memory information updating means 8 to update the "execution memory information" stored in the selection information updating means 11 (step S2309), and the operation proceeds to step S2310. To be more specific, when the second memory 2b contains a program that was decided to be inexecutable, the memory information updating means 8 updates the information 302 stored in the selection information updating means 11 to be "0", and updates the information 301 of the first memory 2a which contains the immediately preceding program to be "1", as shown in FIG. 2(a).

Next, a description will be given of a case where the information processor having the aforementioned structure and operation is applied to an STB.

Figure 8:
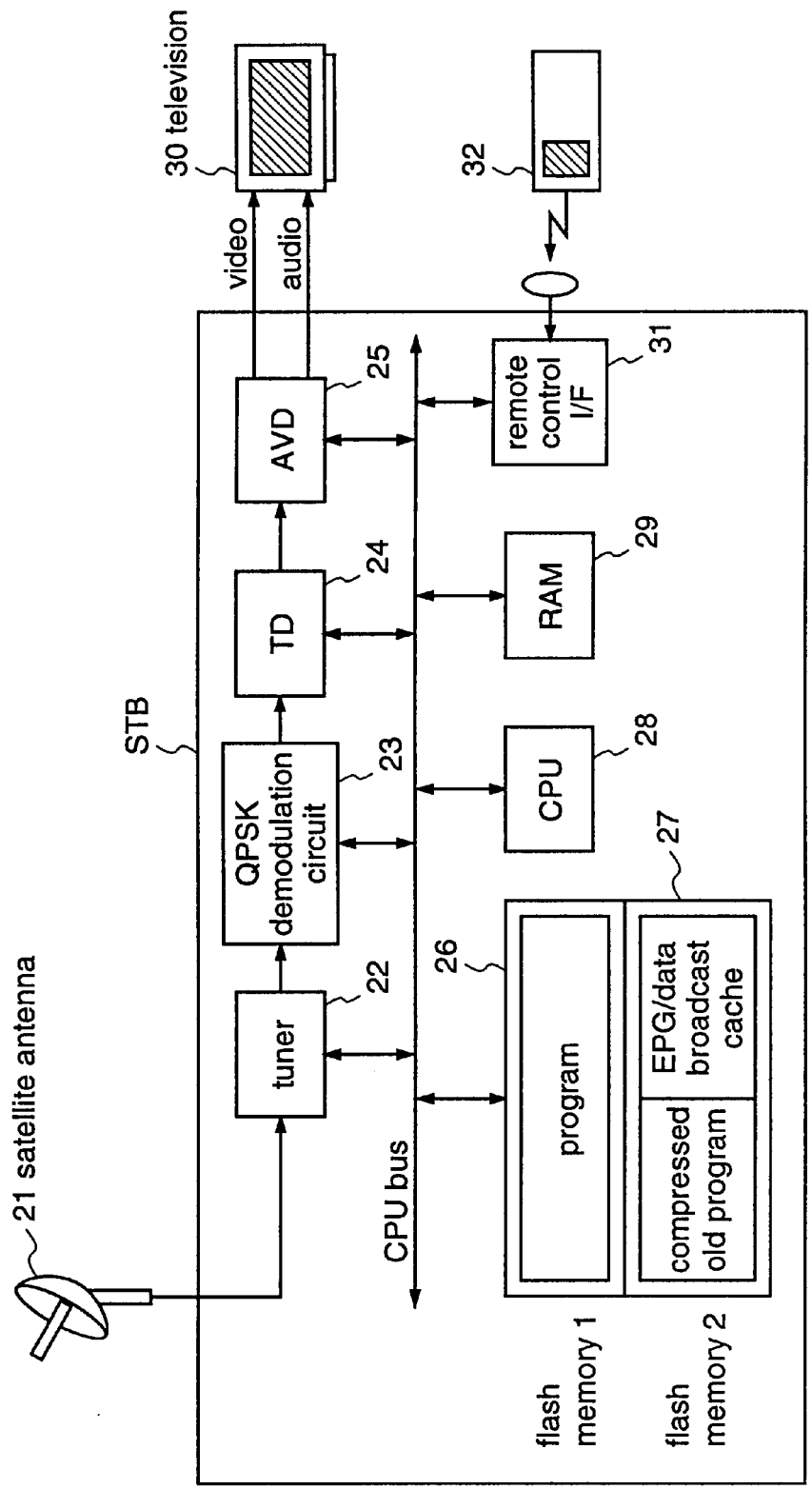
FIG. 8 is a block diagram illustrating a structure of an STB which includes the information processor according to the first embodiment.

FIG. 8 is a block diagram illustrating a structure of an STB that includes the information processor according to the first embodiment. In this figure, numeral 21 denotes a satellite antenna for receiving broadcasts from a satellite. Numeral 22 denotes a tuner. Numeral 23 denotes a Quaternary Phase Shift Keying (hereinafter, referred to as QPSK) demodulation circuit for demodulating radio waves into an MPEG2 (Moving Picture Experts Group 2) transport stream (hereinafter, referred to as TS). Numeral 24 denotes a transport decoder (hereinafter, referred to as TD) for dividing the TS into MPEG audio-video (hereinafter, referred to as AV), an EPG, and data broadcast, outputting the AV to an AV decoder 25, and writing the EPG and the data broadcast to a RAM 29. Numeral 25 denotes an AV decoder (hereinafter, referred to as AVD) for decoding the AV into a video signal and an audio signal of NTSC (National Television System Committee) system. Numeral 26 denotes a flash memory 1 that contains a program for controlling the STB. Numeral 27 denotes a flash memory 2 that contains an old compressed program for backup in the case of abnormality, and is used as a cache area for the EPG and the data broadcast. Numeral 28 denotes a CPU. Numeral 29 denotes a RAM that temporarily holds a work variable of a program, or data. Numeral 30 denotes a television. Numeral 31 denotes a remote control interface for converting a light pulse of a remote control into a command number. Numeral 32 denotes a remote control that transmits a command to the STB.

Hereinafter, a description will be given of the operation of the STB which is constructed as described above.

In the digital broadcasting, the AV, EPG and data broadcast are multiplexed as a TS, and then the TS is modulated by a QPSK modulation circuit to be broadcast. The STB tunes radio waves which are received by the satellite antenna 21 by means of the tuner 22, and demodulates the same in the QPSK demodulation circuit 23 to obtain a TS. The obtained TS is divided into AV, EPG and data broadcast by the TD 24. The AV is outputted to the AVD 25, and the EPG and the data broadcast are temporarily stored in the RAM 29. The AV is decoded by the AVD 25 into a video signal and an audio signal of NTSC system, and outputted to the television 30. The EPG and the data broadcast temporarily stored in the RAM 29 are stored in a free space of the flash memory 2, and read by the program of the STB stored in the flash memory 1 as required. Here, the reason why the EPG and the data broadcast are temporarily stored in the RAM 29 is because the writing speed for the flash memory cannot follow the processing of the TD 24. The program of the STB reads the EPG and the data broadcast which are stored in the free space of the flash memory 2, as well as controls the hardware of the STB to reproduce video and audio from radio waves of the digital broadcasting which are received by the satellite antenna 21, displays the EPG on the television screen to switch the channel to a desired program, receives the data broadcast to display the contents on the screen, or makes the contents go forward by the operation of the remote control. Further, this program performs downloading for update of the program, or switches the program to a backup program in the case of abnormality.

Next, properties of the EPG and the data broadcast will be described. The EPG and the data broadcast are broadcast by a data carousel method. The data carousel method is a transmission method by which the same data is repeatedly transmitted, whereby the data can be sent reliably. However, in this data carousel method, a latency time occurs before necessary data is obtained. Therefore, data is commonly cached for speeding up. In this case, when data is cached in a volatile RAM, the cached contents are lost when the STB is powered off. Therefore, when the EPG or data broadcast is utilized immediately after the power is turned on, the latency time occurs and the response becomes worse. On the other hand, when a nonvolatile flash memory is used as a cache, the cached contents are held even when the power is turned off. Accordingly, even when the EPG or data broadcast is utilized immediately after the power is turned on, no latency time occurs. Besides, since cached data of the EPG or data broadcast is broadcast by the data carousel method at all times, no problem is presented even when the cached data is abandoned in the case of abnormality such as when downloading of a program ends in failure, or when faults occur due to a bug in the program.

As described above, the information processor 1 according to the first embodiment includes plural storage areas, and stores a newly obtained program in a memory which is not being used at present and compresses an old program to create a free space in a memory. Therefore, the free space in the memory can be allocated to input of other data, whereby it can be utilized efficiently. Further, when an error occurs while an activated program is being executed or an error occurs while a program is being updated, a compressed program can be restored and executed.

As a countermeasure against abnormal processing such as power-down, flags indicating that respective processes are in operation are given to information of respective memories in the selection information updating means 11 or the respective memories, and then measures are taken on the basis of these flags.

The information processor 1 according to the first embodiment includes two memories, while the number of memories is not limited to two. For example, even when one memory is divided into two or more storage areas, the above-mentioned processes can be implemented similarly. When the information processor includes at least two memories, one of the memories is selected by chip select, while when the processor includes one memory, one storage area is selected by an address space. Further, when three or more memories are included, the storage area switching means 3 performs an operation for successively changing the memories.

According to the information processor 1 of the first embodiment, the processes which are executed by the program execution means 13, the program writing means 6, the program compression means 7, and the program restoration means 12, respectively, (hereinafter, referred to as each process) are carried out in the following way. Switching to a memory in which each process is to be executed is performed by giving a switch instruction to the storage area switching means 3 or the program execution area switching means 4 (hereinafter, referred to as each switching means), whereby each switching means reads necessary information from the selection information updating means 11 to switch between the memories. However, it is also possible that each means corresponding to each process obtains information relating to a memory switch instruction from the selection information updating means 11 to switch between the memories.

Each program for executing each process in FIG. 1 which schematically shows the whole processing (hereinafter, refer the program execution means, the program updating means, the program compression means and the program restoration means to collectively as a basic program) can be included in each storage area in the program storage unit 2. Or the basic program can be obtained by the program obtaining means 5 as an external program, together with other control program groups of the information processor 1. It is preferable that the basic program is obtained as an external program because an updated program can be obtained more easily in this case.

In the information processor 1 of the first embodiment, the storage area switching means 3 and the program execution area switching means 4 are separate elements. However, it is also possible that one switching means is included and the memories are switched according to respective processes.

Further, it is possible that plural memories are arranged in parallel so that while a program stored in one memory is being executed, a program stored in the other memory is compressed.

In this first embodiment, the present invention is applied to an STB, while it is not limited to the STB but can be applied to other information processor.

What is claimed is:

1. An information processor comprising:

a program obtaining means for obtaining a program;

a program storage means having plural storage areas and storing the program obtained by the program obtaining means in any of the plural storage areas;

a program execution means for executing the program;

a selection information updating means for storing execution memory information indicating a storage area which contains a program to be executed by the program execution means, compression information indicating compression states of programs stored in the storage areas, and memory relation information indicating a relation of the plural storage areas;

a program execution area switching means for selecting one of the storage areas on the basis of the execution memory information;

a storage area switching means for selecting one of the storage areas on the basis of the information in the memory information storage area;

a program writing means for writing the program;

a program compression means for compressing the program;

a program restoration means for restoring the program compressed by the program compression means; and a memory information updating means for updating information stored in the selection information updating means.

2. The information processor of claim 1 wherein the program execution means executes a program stored in the storage area which is selected by the program execution area switching means on the basis of the execution memory information.

3. The information processor of claim 1 wherein the program writing means writes the program obtained by the program obtaining means in the storage area which is selected by the storage area switching means on the basis of the execution memory information and the memory relation information.

4. The information processor of claim 1 wherein the program compression means compresses a program stored in the storage area which is selected by the storage area switching means on the basis of the execution memory information, the compression information and the memory relation information, and the program writing means writes the compressed program in the same storage area as said storage area.

5. The information processor of claim 4 wherein the program restoration means restores the compressed program stored in the storage area which is selected by the storage area switching means on the basis of the execution memory information, the compression information and the memory relation information, and the program writing means writes the restored program in the same storage area as said storage area.

6. The information processor of claim 1 wherein the program storage means is a nonvolatile memory.

7. The information processor of claim 1 wherein a free space in the storage area, which is obtained by compressing the program by the program compression means, is used as a cache area for an electronic program guide.

8. An information processing method comprising:

a program obtaining step of obtaining a program;

a program storage step of storing the program obtained in the program obtaining step in any of plural storage areas;

a program execution step of executing the program;

a memory information storage step of storing execution memory information indicating a storage area which contains a program to be executed in the program execution step, compression information indicating compression states of programs stored in the storage areas, and memory relationship information indicating a relation of the plural storage areas;

a program execution area switching step of selecting one of the storage areas on the basis of the execution memory information;

a program storage area switching step of selecting one of the storage areas on the basis of the information stored in the memory information storage step;

a program writing step of writing the program;

a program compression step of compressing the program;

a program restoration step of restoring the program compressed in the program compression step; and a memory information updating step of updating the information stored in the memory information storage step.

9. The information processing method of claim 8 wherein in the program execution step, a program stored in the storage area which is selected in the program execution area switching step on the basis of the execution memory information is executed.

10. The information processing method of claim 8 wherein in the program writing step, the program obtained in the program obtaining step is written in the storage area which is selected in the storage area switching step on the basis of the execution memory information and the memory relation information.

11. The information processing method of claim 8 wherein in the program compression step, a program stored in the storage area which is selected on the basis of the execution memory information, the compression information and the memory relation information in the storage area switching step of selecting one of the storage areas is compressed, and in the program writing step, the compressed program is written in the same storage area as said storage area.

12. The information processing method of claim 11 wherein
in the program restoration step, the program compressed in the storage area which is selected in the storage area switching step on the basis of the execution memory information, the compression information and the memory relation information is restored, and
in the program writing step, the restored program is written in the same storage area as said storage area.

13. A computer-readable storage medium which contains a program for making a computer implement:
a program obtaining process for obtaining a program;
a program storage process for storing the program obtained in the program obtaining process in any of plural storage areas;
a program execution process for executing the program;
a memory information storage process for storing execution memory information indicating a storage area which contains a program to be executed in the program execution process, compression information indicating compression states of programs stored in the storage areas, and memory relation information indicating a relation of the plural storage areas;
a program execution area switching process for selecting one of the storage areas on the basis of the execution memory information;
a storage area switching process for selecting one of the storage areas on the basis of the information stored in the memory information storage process;
a program writing process for writing the program;
a program compression process for compressing the program;
a program restoration process for restoring the program compressed in the program compression process; and
a memory information updating process for updating the information stored in the memory information storage process.

* * * * *